Sept. 20, 1971  M. N. ANDERSON  3,606,066
INSULATED GRILL AND FIRE BUCKET
Filed Aug. 28, 1969  2 Sheets-Sheet 1
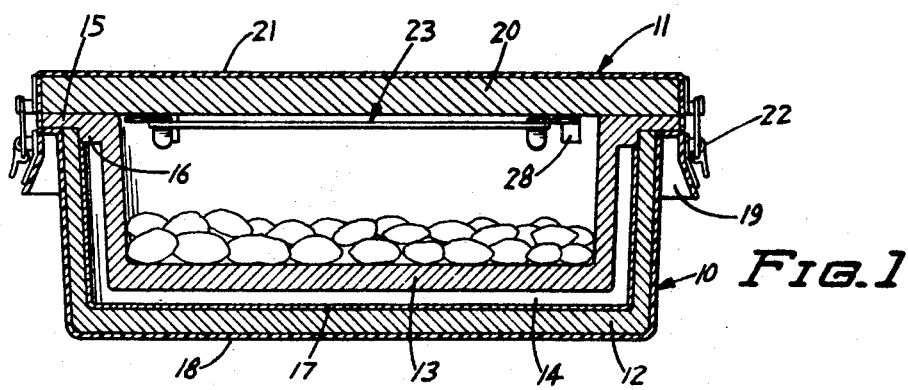
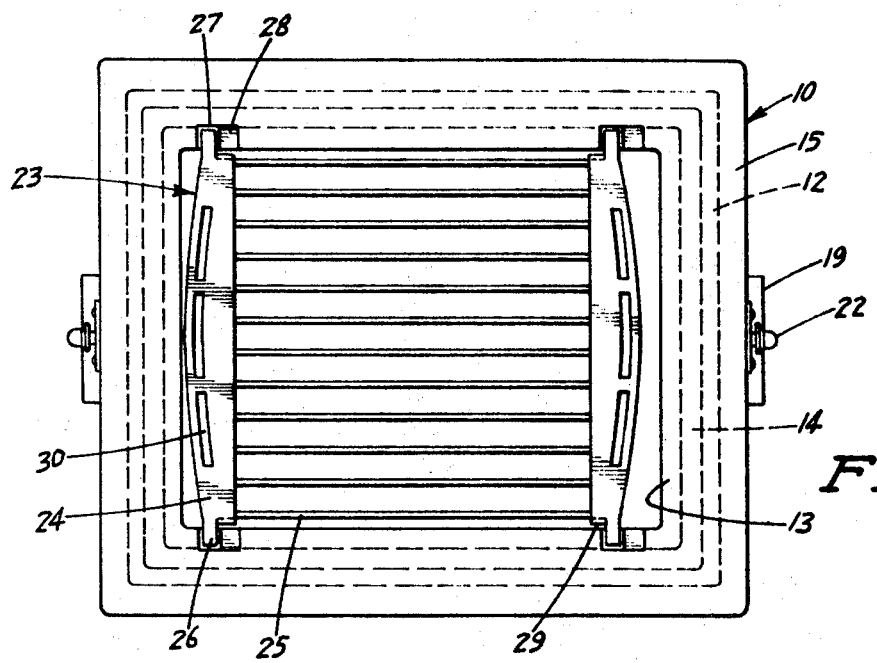
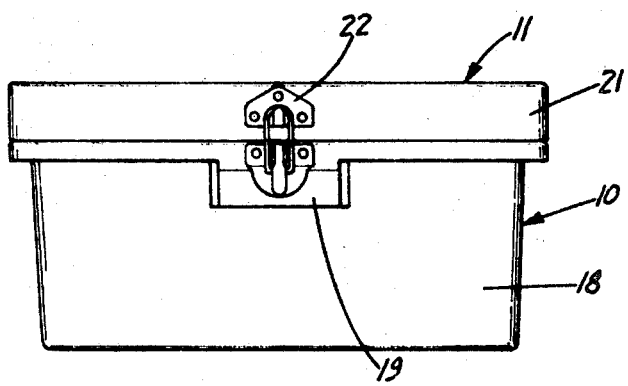
INVENTOR.
MAURICE N. ANDERSON
BY
Burd, Braddock & Barty
ATTORNEYS

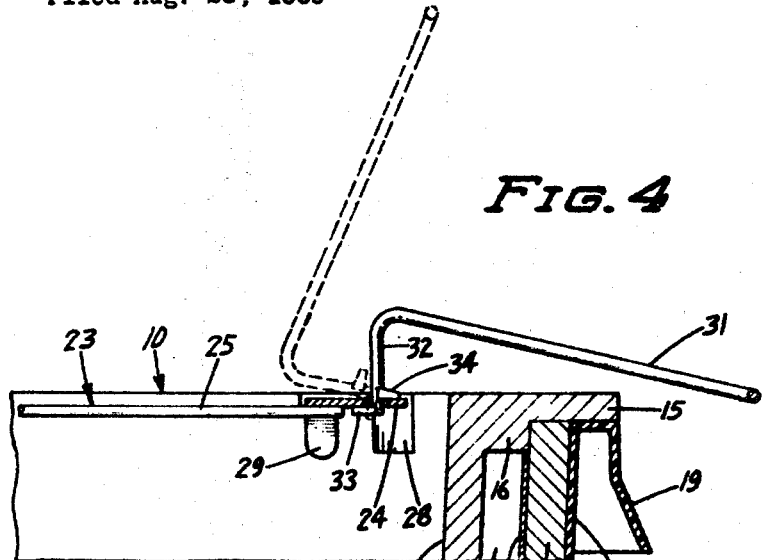
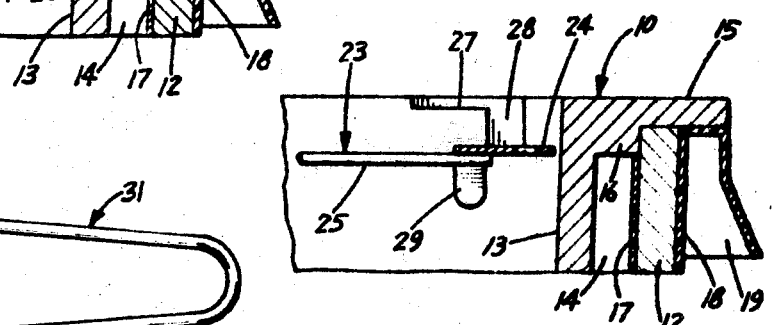
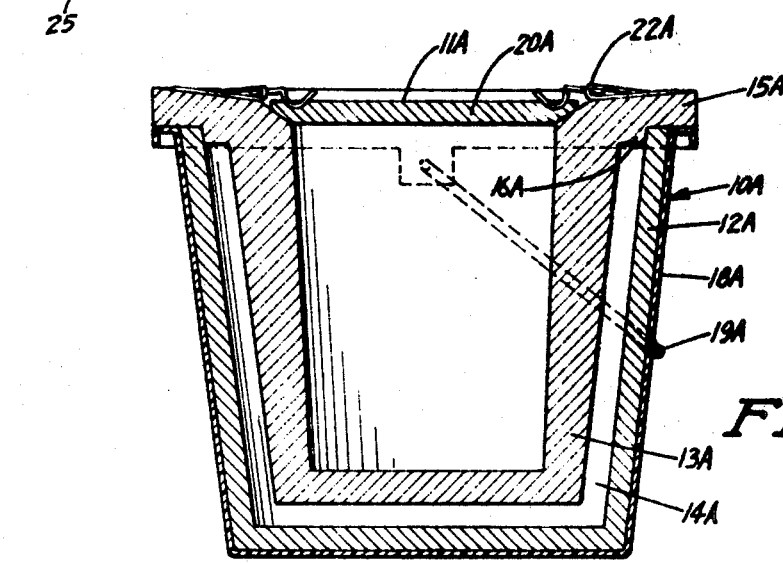

United States Patent Office 3,606,066
Patented Sept. 20, 1971

3,606,066
INSULATED GRILL AND FIRE BUCKET
Maurice N. Anderson, 3301 Wendhurst Ave. NE.,
Minnneapolis, Minn. 55418
Filed Aug. 28, 1969, Ser. No. 853,774
Int. Cl. B65d 25/18
U.S. Cl. 220—9R    4 Claims

ABSTRACT OF THE DISCLOSURE

A molded heat insulative open-topped container for ignited fuel, having a closely fitting cover for extinguishing the fuel when placed over the open top. Depending upon its size, the container may be used as a firebox for a cooking grill, or as a receptacle for receiving the fuel from a grill firebox for quickly extinguishing and conserving the fuel for reuse. Preferably the container is molded from a micaceous material admixed with a hardenable binder. Desirably the container is double-walled to reduce its weight and provide an insulating air cell. A liner of heat reflective material may be used within the cell to direct heat from the fuel inwardly to the cooking zone.

---

This invention relates to an insulated lightweight portable cooking grill and fire bucket. Barbecuing food over charcoal coals has increased tremendously in popularity in recent years so that it has become a commonplace facet of the American way of life. People barbecue on picnics, on camping trips, on the beach, in their house trailers and mobile homes and in their campers. At home they cook on the apartment balcony, in the fireplace, on the patio, under the kitchen vent hood, etc.

In spite of its popularity, there are some drawbacks and inconveniences associated with barbecue cooking. The cooking grill itself is usually bulky, or heavy, or both. The fuel in the form of charcoal briquettes is somewhat bulky and when cooking away from home, usually more fuel is carried than is necessary. After cooking is completed, the coals are only partially consumed and are hot. If the firebox of the grill is metal, it also is usually hot. Disposal of the coals presents a problem. If they are thrown on the ground, they present a fire hazard to vegetation and burn hazard to humans and lower animals. If they are dumped in a stream, they pollute it. They may be buried but any means of disposition by throwing the coals away represents waste. If the coals are quenched in the grill, they may be reused, but not for several days until they dry out. Use of sand or chemicals in the grill is only partially satisfactory.

The cooking grill, according to the present invention, is in the form of a lightweight box-like container open at the top to support a grate or rack and having a close-fitting cover to be used to smother the fire after cooking is completed. The burning coals are extinguished without the use of water, sand or chemicals and are available for reuse when needed whether in minutes, hours or days. The heat and odor of smoldering fire is eliminated. The grill is of a size small enough to be readily portable. It is formed from lightweight heat-insulative material so as to be easily carried and to confine the heat to the firebox without the outside of the container becoming hot. It is of strong sturdy construction.

Preferably the appliance is formed with hollow double-walled construction which contributes to its lightness of weight and heat insulative properties. Desirably the hollow air cell is lined with a heat reflective material to concentrate the heat in the inside of the firebox and further contribute to the cool exterior. A handle is provided to facilitate carrying. The cover desirably is lockable for safety so that burning coals cannot accidentally escape.

The cooking grill is desirably also provided with a colorful attractive exterior covering. The firebox may be used for storage and for carrying of charcoal. A similar container in smaller size may be used for extinguishing of burning charcoal from a conventional barbecue grill and for storing and carrying the charcoal until it is to be reused.

The barbecue grill in its preferred form is provided with a grate or rack which may be stored within the covered firebox. The grate is provided with a removable handle which likewise may be stored within the container.

The invention is illustrated in the accompanying drawings in which the same numerals are used to identify corresponding parts and in which:

FIG. 1 is an elevation, in section, through one form of barbecue grill according to the present invention shown with top and grate in place;

FIG. 2 is a top plan view of the barbecue grill of FIG. 1 with the top cover removed;

FIG. 3 is an end elevation with top locked in place;

FIG. 4 is a fragmentary section on an enlarged scale showing the manner in which the grate is supported and the manner in which the removable handle is attached;

FIG. 5 is a fragmentary top plan on an enlarged scale of the rack with handle engaged;

FIG. 6 is a fragmentary section on an enlarged scale showing the grate in an adjusted lower position over the firebox; and FIG. 7 is an elevation, in section, of an insulated fire bucket according to the present invention.

Referring now to the drawings and particularly to FIGS. 1, 2 and 3, the barbecue cooking grill according to the present invention comprises generally a lower open top box-like structure, indicated generally at 10, and a lid or cover, indicated generally at 11. The bottom portion 10 of the cooking grill is generally rectangular in configuration. In its preferred form, it has an outer one-piece molded shell 12 having a horizontal bottom wall and vertical side and end walls, and open top. Fitted within the outer shall 12 is a molded one-piece inner shell 13 likewise having bottom, side and end walls and open top, but of smaller size such that, when the inner shell is fitted within the outer shell, an air space 14 exists between the respective bottom, side and end walls.

The top perimeter of the inner shell 13 is provided with an outwardly extending flange 15, the bottom surface of which rests upon the upper edge of the side and end walls of outer shell 12. Flange 15 is desirably provided with an orienting and positioning step 16 which fits within the open top of the outer shell with a close slide fit and functions to center the inner shell 13 within the outer shell 12. The air space 14 is desirably provided with a liner 17 formed of a heat reflective material, such as aluminum foil or the like, shaped to conform to the configuration of the outer shell 12.

The bottom portion of the cooking grill is desirably provided with an outer decorative and protective covering 18 which may be in the nature of a coating of paint or enamel or the like but desirably is a pre-formed shell of synthetic resinous material having generally the same rectangular configuration as outer shell 12 and adapted to fit thereover with a close slide fit. Handles 19 are preferably provided at opposite ends of the cooking grill to facilitate handling and carrying.

The top cover member 11 is comprised generally of a rectangular slab 20 adapted to fit tightly over the upper surfaces of flange 15 of the inner firebox shell 13 so as to form a substantially air-tight seal therewith to shut out oxygen from the firebox and extinguish burning coals when the lid is put in place. If desired, the cover member 20 may be formed so as to partially telescope within the upper perimeter of the firebox inner shell 13 to form a tighter closure. The cover member 20 is also desirably provided with an outer decorative and protective cover 21. If the decorative cover 21 is a pre-formed synthetic resinous shell, a lip which extends over the ends of flange 15 is desirably provided so as to give the assembled device a neat finished appearance. For maximum safety and convenience, locking means, such as trunk-type locks 22, are provided at opposite ends of the cooking grill to permit easy locking of the cover in place and easy release of the cover.

The inner shell firebox member 13 is adapted to receive a food-supporting grate or rack, indicated generally at 23. The grate or rack comprises a pair of end plates 24 between which a plurality of parallel spaced apart wires or rods 25 extend. The grate or rack 23 is of generally rectangular configuration corresponding in size generally to the open top of the inner shell 13, but preferably slightly shorter in length. Each end plate 24 is provided with a pair of outwardly extending tabs or ears 26 which engage the opposite side walls of the inner shell firebox 13.

Preferably the inside surfaces of each of the side walls of the inner shell 13 are provided with a plurality of closely spaced stepped recesses 27 and 28 adapted to receive the grate ears 26. As best seen in FIG. 2, the recesses 27 and 28 are located generally at the four corners of the firebox. As best seen in FIG. 6, recess 27 is relatively shallow. Recess 28 is spaced longitudinally from recess 27 and is relatively deeper. This permits placement of the grate 23 at varying distances from the charcoal bed in the firebox. Since the grate 23 is somewhat shorter in overall length than the open top of the firebox 13, this longitudinal movement of the grate to engage one recess or the other is permitted.

Each grate end plate 24 is desirably also provided with a pair of downturned tabs 29 which function as legs to hold the grate surface free in the event the grate is placed on a table or floor or the like. Tabs 29 are spaced apart so as to fit within the open top of the firebox between the opposite side walls.

The end plates 24 of grate 23 are also provided with a plurality of slots 30 or other openings to permit engagement of the grate with a removable handle means 31. The handle 31 is formed from heavy wire or light rod and includes a flat U-shaped or V-shaped portion adapted to be grasped by the hand and at the open end having a pair of legs 32 extending downwardly at an acute angle. At the end of each leg 32 is a forwardly extending toe member 33 adapted to extend through slot 30 and engage the bottom surface of end plate 24. Spaced upwardly from toe member 33 and extending backwardly in the opposite direction is a heel member 34 adapted to engage the upper surface of end plate 24. The handle 31 is easily inserted in slot 30 by holding the handle so that the toes extend into the slot. Then as the handle is pivoted backwardly, the heels 34 rest on the end plate. When the handle is grasped and lifted, the opposing forces of toe 33 on the underside of the grate end plate and heel 34 on the top side retain the handle in place and permit the entire grate and contents to be lifted.

In FIG. 7, there is shown a modified form of construction of a unit intended primarily as a fire bucket for re-receiving lighted coals from a conventional barbecue grill, but, depending upon its size, also useful as a cooking grill itself. This fire bucket, indicated generally at 10A, is generally frusto-conical in shape having an outer shell 12A, an inner shell 13A of the same configuration but smaller so that an annular air cell 14A exists between the shells. Inner shell 13A has an outwardly extending flange 15A which engages the top of outer shell 12A and desirably is provided with an orienting step 16A to center the inner shell within the outer shell. The entire unit is designed so as to fit within a synthetic resinous plastic pail which forms the outer decorative covering 18A and is provided with a handle 19A for easy carrying. A cover 11A, generally in the form of a beveled or chamfered disc 20A, tightly engages the open top of the inner shell 13A and is held in place by means of spring locks 22A.

This fire bucket is intended primarily for receiving the coals from a conventional charcoal cooker to smother them and leave them available for reuse whenever desired. For this purpose, it may be generally relatively small in size and capacity. However, the unit may be made in any size and can support a grate or rack if it is desired to use it for cooking.

The outer shells 12 and 12A, inner shells 13 and 13A and cover members 20 and 20A of both forms of cooking grill and fire bucket are relatively thick and molded from a settable heat-insulating material. In the case of single walled construction, the wall thicknesses generally will range between about 1½ and 3 inches. In the event of double walled construction, the individual walls may range between about ¾ to 1½ inches. The air cell 14 is desirably between about ½ and 1 inch in thickness. The inner and outer shells need not be of the same thickness. Generally, if of unequal thickness, the inner firebox shell will be the thicker. Although size is not a critical factor, by way of illustration a cooking grill according to the embodiment of FIGS. 1, 2 and 3 may have overall exterior dimensions of about 17 inches long by 14 inches wide and 7½ inches high. In this instance, the open top of the firebox is about 10¼ by 13½ and the firebox has a depth of about 4 inches.

A preferred heat insulative material is vermiculite admixed with a settable binder. Vermiculite is a micaceous product composed of ferrous aluminum magnesium silicate expanded by heating to a density of only about 8 pounds per cubic foot. The vermiculite is admixed with a settable binder in liquid to a moldable consistency and formed in the desired shape. A binder found to be useful is made up of a mixture of wheat paste and a hydratable cementitious material. One typical binder composition is made up of a mixture of one part by volume of patching plaster (which is principally plaster of Paris-calcium sulfate with a small amount of an adhesive binder such as dextrin and a small amount of pumice powder in the proportions 32:4:4), one part by volume of Portland cement (which is principally a mixture of tricalcium silicate, dicalcium silicate and tricalcium and aluminate), and two parts of wheat flour paste. Another useful binder composition is made up of a mixture of one part of wheat paste and one part of fire clay (which is a mixture of kaolin and sand).

The materials are admixed in about the following proportions: 35 to 45 parts by volume of vermiculite, 5 to 7 parts by volume of binder and 10 to 14 parts by volume of water, the amount of water being governed to give the desired moldable consistency without being either too stiff or too runny. A typical mixture is made up of 40 parts by volume of vermiculite, 6 parts by volume of binder and 12 parts by volume of water.

The material is formed in a mold of the desired configuration. It should preferably be pressed or tamped to eliminate any voids. The material sets up hand hardens under ambient conditions in a matter of several hours to a tough sturdy concrete-like material but which is lightweight. Preferably the mold has a smooth surface so that the molded product has a similar smooth surface. Where the double walled construction is employed, the inner and outer shells are assembled and preferably cemented together to form a unitary structure, the heat-reflective liner being installed prior to assembly. Asbestos may be substituted for vermiculite.

In a number of controlled tests utilizing a fire bucket constructed generally according to FIG. 7 but with single wall construction, the following results were observed:

Number of controlled tests—16
Number of burning charcoals in each test—40
Temperature of burning coals in fire bucket—1600–1800° F.

Maximum temperature on outside of bucket—115° F.
Average temperature on outside of bucket—107° F.
Elapsed time to maximum external temperature—35 minutes
Elapsed time until coals are extinguished—22 minutes The embodiments of the invention in which an exclusive property or privilege is claimed are defined as follows:

1. An insulated barbecue cooking appliance comprising:
   (A) an open topped fuel container having a bottom wall and surrounding vertical walls,
   (B) said container being formed in one piece from a hardened molded lightweight material having heat insulative properties, said material being composed of a heat insulative mineral material admixed with a binder in which:
      (1) said heat insulative material is vermiculite,
      (2) said binder is a mixture of wheat paste with at least one hydratable material selected from the group consisting of plaster, cement and fire clay,
      (3) said wheat paste and hydratable material are present in about equal proportions by volume, and
      (4) said vermiculite and binder are present in the amount of about 35 to 45 parts by volume of vermiculite and 5 to 7 parts by volume of binder,
   (C) a closely fitting cover for the open top of said container,
   (D) said cover being formed in one piece from a hardened molded lightweight material having heat insulative properties, and
   (E) means for retaining said cover in closely fitting engagement with the open top of the container.

2. An appliance according to claim 1 further characterized in that:
   (A) said container is supported in an outer shell formed in one piece from a hardened molded lightweight material having heat insulative properties,
   (B) said outer shell has inside dimensions larger than the outside dimensions of said container, whereby the outer shell is spaced from the container to provide an air space therebetween.

3. An appliance according to claim 2 further characterized in that a liner of heat reflective material is disposed within said air space.

4. An appliance according to claim 1 further characterized in that the outer surfaces of said appliance are substantially encased in a relatively thin decorative and protective covering of synthetic resinous plastic material.

References Cited

UNITED STATES PATENTS

| | | | |
|---|---|---|---|
| 1,298,202 | 3/1919 | Hall et al. | 220—9 |
| 1,901,556 | 3/1933 | Gottschalk | 220—9 |
| 1,973,880 | 9/1934 | Moody | 220—9(D) |
| 2,170,409 | 8/1939 | Hoffman et al. | 220—9 |
| 3,002,646 | 10/1961 | Lewis | 220—9 |

FOREIGN PATENTS

| | | | |
|---|---|---|---|
| 866,835 | 2/1953 | Germany | 220—9 |
| 693,273 | 6/1953 | Great Britain | 126—25(C) |
| 829,670 | 3/1960 | Great Britain | 220—9 |
| 431,701 | 3/1948 | Italy | 220—9 |

JOSEPH R. LECLAIR, Primary Examiner

J. R. GARRETT, Assistant Examiner

U.S. Cl. X.R.

126—25C; 252—62